United States Patent [19]

Bujalski

[11] Patent Number: 4,681,860

[45] Date of Patent: Jul. 21, 1987

[54] CERAMIC MATERIALS FROM POLYCARBOSILANES

[75] Inventor: Duane R. Bujalski, Monitor Township, Bay County, Mich.

[73] Assignee: Dow Corning Corporation, Midland, Mich.

[21] Appl. No.: 938,472

[22] Filed: Dec. 5, 1986

Related U.S. Application Data

[63] Continuation-in-part of Ser. No. 868,207, May 23, 1986, abandoned, which is a continuation of Ser. No. 678,122, Dec. 4, 1984, abandoned.

[51] Int. Cl.⁴ .............................................. C04B 35/56
[52] U.S. Cl. ......................................... 501/88; 501/90
[58] Field of Search .................................... 501/88, 90

[56] References Cited

U.S. PATENT DOCUMENTS

| | | | |
|---|---|---|---|
| 4,298,558 | 11/1981 | Baney et al. | 501/88 |
| 4,298,559 | 11/1981 | Baney et al. | 501/88 |
| 4,310,481 | 1/1982 | Baney | 501/88 |
| 4,310,482 | 1/1982 | Baney | 501/88 |
| 4,314,956 | 2/1982 | Baney et al. | 501/88 |
| 4,374,793 | 2/1983 | Koza et al. | 501/88 |
| 4,414,403 | 11/1983 | Schilling, Jr. et al. | 501/88 |

*Primary Examiner*—Mark L. Bell
*Attorney, Agent, or Firm*—Robert L. McKellar

[57] ABSTRACT

A method is disclosed for increasing the ceramic yield of a ceramic material obtained by firing a polycarbosilane to an elevated temperature in an inert atmosphere or in a vacuum. The method involves adding iron (II) octoate or iron (III) octoate to the polycarbosilane prior to firing.

11 Claims, No Drawings

CERAMIC MATERIALS FROM POLYCARBOSILANES

This is a continuation-in-part of U.S. application Ser. No. 868,207 filed May 23, 1986, now abandoned which is a continuation of U.S. application Ser. No. 678,122 filed Dec. 4, 1984, now abandoned.

BACKGROUND OF THE INVENTION

This invention relates to the preparation of ceramic materials from polycarbosilanes with increased ceramic yields. The ceramic materials of this invention are obtained by firing a mixture of a polycarbosilane and iron octoate to an elevated temperature in an inert atmosphere or in a vacuum. The iron octoate additives allow for the formation of ceramic materials with increased ceramic yield.

Ceramic material prepared from polycarbosilane polymers are known in the art. Verbeck et al. in German Application Publication No. 2,236,078.7, which is hereby incorporated by reference, prepared ceramic materials by firing at elevated temperatures in an inert atmosphere, a polycarbosilane prepared by the pyrolysis of monosilanes.

Yajima et al. in U.S. Pat. Nos. 4,052,430 (Oct. 4, 1977) and 4,100,233 (July 11, 1978), which are both hereby incorporated by reference, prepared ceramic materials by the pyrolysis of polycarbosilanes in an inert atmosphere or in a vacuum at an elevated temperature. The polycarbosilanes were prepared by thermally decomposing and polycondensing polysilanes.

Yajima et al. in U.S. Pat. Nos. 4,220,600 (Sept. 2, 1980) and 4,283,376 (Aug. 11, 1981) which are both hereby incorporated by reference, prepared ceramic materials by the pyrolysis of polycarbosilanes partly containing siloxane bonds at an elevated temperature under an inert atmosphere or a vacuum. The polycarbosilane partly containing siloxane bonds was prepared by heating polysilanes in the presence of about 0.01 to 15 weight percent of a polyborosiloxane in an inert atmosphere.

Iwai et al. in U.S. Pat. No. 4,377,677 (Mar. 22, 1983), which is hereby incorporated by reference, also produced ceramic materials by the pyrolysis of polycarbosilane at elevated temperatures under an inert atmosphere or vacuum. The polycarbosilanes of Iwai et al. were prepared by heating a polysilane at 50°–600° C. in an inert gas, distilling out a low molecular weight polycarbosilane fraction and then polymerizing the distilled fraction at 250° to 500° C. in an inert atmosphere.

Schilling et al. in U.S. Pat. No. 4,414,403 (November 1983), which is hereby incorporated by reference, produced ceramic material by the pyrolysis of branched polycarbosilanes at elevated temperatures under an inert atmosphere or vacuum. The branched polycarbosilanes were prepared by reacting monosilanes with an active metal in an inert solvent at elevated temperatures where at least some of the monosilanes contain vinyl groups or halomethyl groups capable of forming branching during the polymerization.

Koga et al. U.S. Pat. Nos. 4,105,455 (Aug. 8, 1978) and 4,374,793 (Feb. 22, 1983) disclosed a method of preparing dense sintered silicon carbide bodies from polycarbosilanes which optionally contained sintering aids. The method of U.S. Pat. No. 4,105,455 involves (A) grinding the polycarbosilane to a powder, and (B) hot pressing the polycarbosilane powder so as to produce a dense sintered silicon carbide body by charring the powder in a hot press mold, heating the powder in a monoxidizing atmosphere to decompose the powder to produce silicon carbide, and sintering the silicon carbide under pressure. Sintering aids may be added either during the preparation of the polycarbosilane or may be added to the polycarbosilane powder in the method of U.S. Pat. No. 4,105,455. The method of U.S. Pat. No. 4,374,793 involves (A) grinding the polycarbosilane to a powder, (B) decomposing the polycarbosilane powder thermally to obtain silicon carbide, (C) molding the silicon carbide powder and (D) sintering the molded silicon carbide powder. Sintering aids may be added during the preparation of the polycarbosilane or may be added to the silicon carbide powder. Disclosed sintering aids include the substances or compounds of such elements as B, Al, Fe, Ga, Ti, W, Mg, Ca, Ni, Cr, Mn, Zr, In, Sc, Be, and the like. Preferred sintering aids include substances or compounds of such elements as B, Al, Fe, W, Mg, Ti and others. The halogen- and organic-substituted compounds are preferred as sintering aids.

Yajima et al., J. Mat. Sci., 13, 2569 (1978) and Hasegawa et al., J. Mat. Sci., 18, 3633 (1983) also discuss polycarbosilanes which are useful as preceramic polymers for preparing silicon carbide ceramics.

What is newly discovered is that iron octoate, when added to polycarbosilanes prior to firing at elevated temperatures, allows for the formation of ceramic materials with a significant increase in ceramic yield relative to ceramic materials fired under the same conditions without the additive.

THE INVENTION

This invention relates to a method of preparing a ceramic material with increased ceramic yield, said method comprising heating a modified polycarbosilane in an inert atmosphere or in a vacuum to a temperature of at least 750° C. until said modified polycarbosilane is converted to a ceramic material with increased ceramic yield relative to a non-modified polycarbosilane heated under the same conditions, wherein said modified polycarbosilane is prepared by mixing the non-modified polycarbosilane with an effective, ceramic yield increasing, amount of iron octoate.

Ceramic yield, as employed in this present invention disclosure, is the percentage yield of the ceramic product upon firing a modified or non-modified polycarbosilane to an elevated temperature under an inert atmosphere or in a vacuum until the modified or non-modified polycarbosilane is converted to a ceramic material. The ceramic yield is calculated by dividing the weight of the ceramic product obtained by the initial weight of the modified or non-modified polycarbosilane and then multiplying the result by 100. A correction for the amount of iron octoate added is not made.

The process of this invention is carried out by first mixing a polycarbosilane with an effective amount of iron octoate and then firing the resulting mixture to an elevated temperature under an inert atmosphere or in a vacuum until the resulting mixture is converted to a ceramic material. By "iron octoate" we mean both iron (II) octoate and iron (III) octoate. Iron (III) octoate or $Fe(OOC(CH_2)_6CH_3)_3$ is preferred.

The method of mixing the polycarbosilane and the iron octoate is not critical. It is preferred that the polycarbosilane and the iron octoate be well mixed to help insure that the ceramic yield does not vary significantly throughout the ceramic material or article. Using an organic solvent such as toluene for the mixing medium helps to insure that the two components are well mixed. Other mixing techniques may be used.

The polycarbosilane is mixed with an effective amount of iron octoate. By "an effective amount" of the iron octoate we mean that amount which results in an increased ceramic yield in the resulting ceramic material. Generally the iron octoate is added at such a level so as to obtain a mixture containing the polycarbosilane and 0.1 to 2.0 weight percent of the iron. Iron octoate may be added at higher levels although no added benefits may result. It is preferred that the iron octoate be present at a level equivalent to about 0.5 to 1.5 weight percent of elemental iron. The increase in ceramic yield of the ceramic material prepared by the method of this invention is determined by comparison with the ceramic yield of a ceramic material obtained by firing the same polycarbosilane, without the added iron octoate, under the same experimental conditions.

The mixture of polycarbosilane and an effective amount of a iron octoate is fired to an elevated temperature of at least 750° C. under an inert atmosphere or in a vacuum until the mixture is converted to a ceramic material.

Although not wishing to be held to such a theory, the inventor believes that the iron octoate additives of this invention interact with the polycarbosilane during the early stages of the pyrolysis step. The interaction may be in the form of crosslinking or the promotion of crosslinking of potentially volatile species from the polycarbosilane. By keeping potentially volatile material in the system more carbon, nitrogen, and silicon are available for conversion to ceramic in the latter stages of the pyrolysis step. It is expected that iron octoate will be reduced to iron metal during the pyrolysis.

The polycarbosilanes suitable for use in this present invention contain Si and C as the main skeleton elements in the form of (SiCH$_2$) units. The polycarbosilanes useful in this invention may also contain oxygen as a skeleton element in addition to Si and C as the main skeleton elements. Oxygen may be introduced during preparation or handling or may be incorporated into the polycarbosilane by design. It is preferred that the amount of oxygen present is less than about 10 weight percent, more preferably less than about 5 weight percent, and most preferably less than 1 weight percent. Other elements may also be present as main skeleton elements in addition to Si, C, and O. However, these other elements should be present at less than about 1 weight percent and preferably only be present at trace levels (i.e. less than 0.1 weight percent). Suitable polycarbosilanes may be prepared by methods well known in the art. For example, suitable polycarbosilanes may be prepared from monosilanes by pyrolysis at 400° to 1200° C. as described by Verbeck et al. in German OLS 2,236,078.7. Suitable polycarbosilanes may also be prepared from polysilanes by heating and polycondensing the polysilanes at 300° to 2000° C. under an inert atmosphere or vacuum as described by Yajima et al. in U.S. Pat. Nos. 4,052,430 and 4,100,233. Other suitable polycarbosilanes may be prepared by heating a mixture of polysilanes with about 0.01 to 15 weight percent of a phenylborosilane under an inert atmosphere as described in Yajima et al. in U.S. Pat. Nos. 4,220,600 and 4,283,376. Suitable polycarbosilanes may also be prepared by the method of Iwai et al. U.S. Pat. No. 4,377,677 wherein an improved procedure for preparing polycarbosilanes from polysilanes is disclosed. The branched polycarbosilanes of Schilling (U.S. Pat. No. 4,414,403) are also suitable for use in this present invention. Other polycarbosilanes capable of being converted to ceramic material by pyrolysis at elevated temperatures under an inert atmosphere or vacuum are also useful in the present invention.

Preferred polycarbosilanes for the practice of this invention are prepared from the thermal polycondensation of polysilanes as described in U.S. Pat. Nos. 4,052,430 and 4,100,233.

More preferred polycarbosilanes are prepared by thermally decomposing and polycondensing a polysilane or polysilanes by heating said polysilane or polysilanes at a temperature of 300°–2000° C. in an inert gas, hydrogen, or vacuum wherein said polysilane or polysilanes are selected from the group consisting of cyclic polysilanes of the general formula $(R^1R^2Si)_n$ 

and linear polysilanes of the general formula

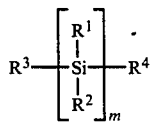

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, $-Si(R^5)_3$ groups where $R^5$ is a alkyl group containing 1 to 4 carbon atoms, and halogen atoms. Examples of $R^1$, $R^2$, $R^3$, and $R^4$ as alkyl groups and $R^5$ include methyl, ethyl, propyl and butyl groups. Examples of $R^1$, $R^2$, $R^3$, and $R^4$ as halogens include chlorine and bromine with chlorine being preferred. The most preferred polycarbosilanes are prepared by the thermal decomposition and polycondensation of dodecamethylcyclohexasilane or polydimethylsilane.

The actual method of preparing the polycarbosilanes for use in the invention is not critical. The polycarbosilanes should contain Si, C, and optionally, O as the main skeleton elements and should be capable of being converted to silicon carbide-containing ceramics upon pyrolysis to elevated temperatures in an inert atmosphere or vacuum. Preferably the polycarbosilanes used in the practice of this invention have a softening point of about 50° to 300° C. and most preferably in the range of 70° to 200° C.

After the polycarbosilane and the iron octoate are mixed, the mixture is fired to an elevated temperature of at least 750° C. until the mixture is converted to a ceramic material. It is generally preferred that the polycarbosilane and iron octoate mixture be vacuum stripped prior to pyrolysis. If the polycarbosilane and iron octoate mixture is of sufficient viscosity or if it possesses a sufficiently low melt temperature, it can be shaped first and then pyrolyzed to give a silicon carbide-containing shaped article such as a fiber. The polycarbosilane and iron octoate mixture can be filled with ceramic type fillers (if desired) and then fired to at least 750° C. to obtain silicon carbide ceramic materials or silicon carbide ceramic articles.

The polycarbosilane and iron octoate mixtures of this invention can be used in both the filled and unfilled state, depending on the application. Thus, it is contemplated within the scope of this invention to coat substrates with filled and unfilled mixtures and heat the substrates to produce ceramic coated articles. Fillers and adjuvants can be milled on 3 roll mills by simply mixing the polycarbosilane and iron octoate of this invention with the fillers and making several passes on the mill. In the alternative, the polycarbosilane and iron octoate can be placed in solvents and the fillers and adjuvants can be added thereto and, after mixing, the solvent can be removed to give the filled mixture. The coating can be carried out by conventional means. The means used depends on the mixture and substrates used and the application one has in mind. Thus, these materials can be brushed, rolled, dipped or sprayed. In the filled state, it is sometimes necessary to trowel the mixture onto the substrate. The polycarbosilane and iron octoate mixtures of this invention may also be used as an infiltrant with ceramic materials or as a matrix material for composites. Other uses will be apparent to those skilled in the art from a consideration of this specification.

So that those skilled in the art can better appreciate and understand the invention, the following examples are given.

A solution method for mixing the polycarbosilane and iron octoate additive was employed. The desired amount of the iron octoate additive was dissolved in dry toluene. The polycarbosilane was added to the toluene solution to give a 35 weight percent solution. The resulting solution was placed in a glass jar, purged with argon, and then sealed. The solution was then agitated for 4 hours on a wheel mixer. Solvent was removed from the modified polycarbosilane by vacuum stripping for four hours at 25° C. and 3 mm Hg and for one hour at 50° C. and 2 mm Hg.

All mixed samples were stored under argon in a dry box until used.

Samples were fired in an Astro Industries Furnace (water cooled, graphite heated, model 1000.3060-FP-12) under a helium atmosphere or in a Lindberg furnace (Heavy Duty SB Type S4877A) under argon.

In the examples, control samples were subjected to the same treatment (i.e., the solution mixing method) as the iron-containing polycarbosilane except that the control samples did not contain iron additive. The ceramic yield of control samples that were subjected to the mixing procedure and control samples that were not subjected to the mixing procedure were essentially identical when fired to elevated temperatures under the same pyrolysis conditions.

The polycarbosilane employed in the example was obtained from Nippon Carbon Co., Ltd., 2-6-1, Hachi-Chobari, Chuo-Ku, Tokyo 104, Japan and is thought to be prepared by the method described in U.S. Pat. Nos. 4,052,430 and 4,100,233. The polycarbosilane was yellow in appearance and was soluble in toluene, xylene, n-hexane, n-heptane, and tetrahydrofuran and was insoluble in methanol and water. IR analysis (KBr plates with film of polycarbosilane cast from toluene solution) indicated absorptions at 740 and 830 cm$^{-1}$ (SiCH$_3$), 1020 and 1355 cm$^1$ (SiCH$_2$Si), 2095 cm$^{-1}$ (SiH), 1255, 1400, 2900, and 2960 cm$^{-1}$ (CH$_3$). Molecular weight distribution was determined by gel permeation chromatography using a four weight percent of the polycarbosilane in a toluene solution with a toluene elutant at a flow rate of 1.5 ml/minute and a differential refratometer detector. Molecular weight measurements were relative to a polysiloxane standard. The polycarbosilane had a number average molecular weight of 1166 g/mole and a weight average molecular weight of 2260 g/mole. The molecular weight polydispersity was 1.94. The polycarbosilane had a penetration temperature of 172° C. as determined on a DuPont Instruments Thermoanalyzer Model 1090 equipped with a Model 1091 DuPont Disk Memory and a DuPont Model 943 Thermomechanical Analyzer. The penetration temperature is related to the softening point.

EXAMPLE 1

A mixture of the powdered polycarbosilane (19.8 g) described above and iron (III) octoate (3.33 g of a toluene solution containing 6 weight percent iron) was prepared using the solution mixing method described above. The amount of iron (III) octoate employed was such that the final polycarbosilane/iron (III) octoate mixture contained 1 weight percent iron. Samples of both a control (polycarbosilane without added iron (III) octoate) and the polycarbosilane/iron (III) octoate mixture were fired to various elevated temperatures under a helium atmosphere in the Astro furnace. The results are presented in Table I. All ceramic yield data for the iron (III) octoate containing polycarbosilane samples are the average of two runs.

TABLE I

| ADDITIVE | TOTAL FIRING TIME (Hrs) | TIME AT FINAL TEMP (Hrs) | FINAL TEMP (°C.) | CERAMIC YIELD (Wt. %) | IMPROVEMENT (%) IN CERAMIC YIELD RELATIVE TO CONTROL |
|---|---|---|---|---|---|
| None | 5.6 | 0.4 | 800 | 56.6 | — |
| Fe (III) Octoate | 5.6 | 0.4 | 800 | 70.2 | 24.0 |
| None | 18.7 | 12.5 | 1000 | 54.9 | — |
| Fe (III) Octoate | 18.7 | 12.5 | 1000 | 68.8 | 25.3 |
| None | 5.6 | 0.4 | 1200 | 54.6 | — |
| Fe (III) Octoate | 5.6 | 0.4 | 1200 | 66.9 | 22.5 |
| None | 5.6 | 0.2 | 1600 | 54.6 | — |
| Fe (III) Octoate | 5.6 | 0.2 | 1600 | 68.1 | 24.7 |
| None | 18.7 | 2 | 1600 | 52.8 | — |
| Fe (III) Octoate | 18.7 | 2 | 1600 | 63.3 | 19.9 |
| None | 5.6 | 0.2 | 2000 | 55.5 | — |
| Fe (III) Octoate | 5.6 | 0.2 | 2000 | 68.6 | 23.6 |
| None | 18.7 | 2 | 2000 | 54.4 | — |
| Fe (III) Octoate | 18.7 | 2 | 2000 | 64.9 | 19.3 |

EXAMPLE 2

This example is for comparative purposes only. A mixture of 12.3 g polycarbosilane as described above and a degassed solution of 0.36 g FeCl$_3$ in 125 ml of toluene was prepared under an agron atmosphere. After filtering the solution, the toluene was removed. The polycarbosilane/FeCl₃ mixture contained about 1 weight percent iron. Both a control sample containing only the polycarbosilane and the polycarbosilane/FeCl₃ mixture sample were fired to 1200° C. at a rate of 5° C./min under argon in the Lindberg furnace. The ceramic yields of the control and the polycarbosilane/FeCl₃ mixture were 61.5 weight percent and 55.2 weight percent, respectively. This represents a decrease of 10.2 percent in the ceramic yield of the FeCl₃ containing polycarbosilane relative to the control.

That which is claimed is:

1. A method of preparing a ceramic material with increased ceramic yield, said method comprising heating a modified polycarbosilane in an inert atmosphere or in a vacuum to a temperature of at least 750° C. until said modified polycarbosilane is converted to a ceramic material with increased ceramic yield relative to a non-modified polycarbosilane heated under the same conditions, wherein said modified polycarbosilane is prepared by mixing the non-modified polycarbosilane with an effective, ceramic yield increasing, amount of iron octoate, wherein the non-modified polycarbosilane is prepared by thermally decomposing and polycondensing a polysilane or polysilanes by heating said polysilane or polysilanes at a temperature of 300°–2000° C. in an inert gas, hydrogen, or vacuum wherein said polysilane or polysilanes are selected from the group consisting of cyclic polysilanes of the general formula $(R^1R^2Si)_n$ and linear polysilanes of the general formula

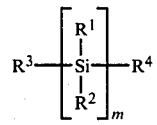

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, —Si($R^5$)₃ groups where $R^5$ is an alkyl group containing 1 to 4 carbon atoms, and halogen atoms.

2. A method as claimed in claim 1 wherein said iron octoate is iron II octoate.

3. A method as claimed in claim 1 wherein said iron octoate is iron III octoate.

4. A method as defined in claim 2 wherein said non-modified polycarbosilane has a softening point of 50° to 300° C.

5. A method as defined in claim 3 wherein said non-modified polycarbosilane has a softening point of 50° to 300° C.

6. A method as claimed in claim 1 wherein said modified polycarbosilane contains from 0.1 to 2.0 weight percent iron.

7. A method as claimed in claim 2 wherein said modified polycarbosilane contains from 0.1 to 2.0 weight percent iron.

8. A method as claimed in claim 3 wherein said modified polycarbosilane contains from 0.1 to 2.0 weight percent iron.

9. A method as claimed in claim 4 wherein said modified polycarbosilane contains from 0.1 to 2.0 weight percent iron.

10. A method as claimed in claim 5 wherein said modified polycarbosilane contains from 0.1 to 2.0 weight percent iron.

11. A method as claimed in claim 1 wherein said cyclic polysilane is dodecamethycyclohexasilane and said linear polysilane is polydimethylsilane.

* * * * *